United States Patent [19]

Chapman et al.

[11] 3,880,763

[45] Apr. 29, 1975

[54] ASYMMETRIC MEMBRANOUS ARTICLES AND METHODS FOR THEIR MANUFACTURE

[75] Inventors: Charles Brian Chapman; Robert Anthony Haldon, both of Pontypool, England

[73] Assignee: Imperial Chemical Industries Limited, London, England

[22] Filed: Jan. 12, 1973

[21] Appl. No.: 322,942

[30] Foreign Application Priority Data

Jan. 12, 1972 United Kingdom............... 1437/72

[52] U.S. Cl. ........ 210/490; 210/500 M; 260/2.5 M; 264/28; 264/49;
[51] Int. Cl. ........................................... B01d 31/00
[58] Field of Search .............. 210/490, 500, 22, 23; 260/2.5 M

[56] References Cited

UNITED STATES PATENTS

| | | | |
|---|---|---|---|
| 3,220,960 | 11/1965 | Wichterle et al. | 260/2.5 |
| 3,607,692 | 9/1971 | Sanner et al. | 260/2.5 M |
| 3,615,024 | 10/1971 | Michaels | 210/490 |

*Primary Examiner*—Frank A. Spear, Jr.
*Attorney, Agent, or Firm*—Cushman, Darby & Cushman

[57] ABSTRACT

Asymmetric membrane comprises a laminar vinyl polymer film in which one layer comprises a semipermeable membrane and the other layer comprises a porous structure. The asymmetric membrane is made by non-thermal polymerisation of a frozen monomer solution, whilst one surface is maintained in a liquid state, and subsequent removal of the solvent.

11 Claims, No Drawings

ASYMMETRIC MEMBRANOUS ARTICLES AND METHODS FOR THEIR MANUFACTURE

This invention relates to asymmetric membranous articles and to methods of making such articles.

Asymmetric membranes of cellulose acetate have been used for some considerable time for desalinating sea or brackish water. Such cellulose acetate membranes, having commercially useful flow rates, have been made by a casting process. However, the use of such membranes has been limited due to the inadequate hydrolytic stability of cellulose acetate. Further it has not proved possible to prepare asymmetric membranes from an addition polymer by such a casting process. We now provide asymmetric membranes comprising addition polymers which are chemically more stable than cellulose acetate. The asymmetric membranous article may comprise a laminar film structure in which one surface layer comprises a semi-permeable membrane and the other adjacent surface layer comprises a porous structure, said porous structure and said semi-permeable membrane comprising the same, or a different, covalently crosslinked vinyl polymer.

The asymmetric membranous article may be prepared by a process characterised in that the laminar structure is obtained by non-thermal polymerisation of a first film consisting of at least one organic monomer containing an ethylenically unsaturated group in the presence of at least one inert liquid, said film having been cooled to at least partially solidify said liquid prior to polymerisation, and a second film consisting of at least one second monomer containing an ethylenically unsaturated group and in a liquid state, at least one of said polymerisations being carried out whilst the said polymerised or umpolymerised first and second films are in a laminar formation.

The term inert liquid encompasses liquids which are solvents for the monomer, are miscible with a liquid monomer or are absorbed by the monomer.

The second monomer from which the semi-permeable membrane is obtained may be in the form of a solution in an inert liquid during the non-thermal polymerisation.

The polymerisation producing the porous structure may be carried out before the polymerisation producing the semi-permeable membrane or vice versa. Alternatively, both polymerisations may be carried out simultaneously.

The monomer or monomers from which the porous structure is obtained and the monomer or monomers from which the semi-permeable membrane is obtained may be chemically the same or different, and cross linking organic compounds containing at least two ethylenically unsaturated groups may be present with either or both monomers. The present asymmetric membranes may have a high crosslink density thus providing improved separation properties, increased tensile strength and reduced compaction during use in reverse osmosis over un-crosslinked membranes.

According to one embodiment of the invention we provide a process for making an asymmetric membranous article from at least one organic monomer containing an ethylenically unsaturated group in the presence of at least one inert liquid comprising the steps in combination (1) forming a film of the monomer-liquid mixture, (2) cooling said film to at least partially solidify the liquid, (3) melting one surface of said film, (4) polymerising to completion said monomer by non-thermal polymerisation whilst maintaining said one surface of said film in a liquid state and (5) subsequently removing said liquid. It is preferred that the film of the mixture is uni-directionally frozen, that is, that crystallisation is initiated at one surface of the film and proceeds unidirectionally throughout the film.

A modification of steps (1), (2) and (3) of the above process comprises spreading the mixture in the form of a film and partially freezing to solidify the liquid such that one surface of said film is maintained in a liquid state.

According to another embodiment of the invention we provide a process for making an asymmetric membranous article from at least one organic monomer containing an ethylenically unsaturated group in the presence of at least one inert liquid comprising the steps in combination (1) forming a film of the monomer-liquid mixture, (2) cooling said film to at least partially solidify said liquid, (3) partially polymerising said monomer to a given depth by uni-directional non-thermal polymerisation, (4) melting that part of the solidified film containing unpolymerised monomer, (5) subjecting said unpolymerised monomer to polymerisation and (6) subsequently removing said liquid.

The asymmetric membranous articles of the present invention may be designed for complete or partial separation of one component of an aqueous solution or of an organic solution. Since the separation is believed to be achieved by dissolution of one component in the semi-permeable membrane and diffusion through said membrane under a pressure gradient, the membrane must have some affinity for the component being passed through the membrane. However, the affinity must not be so high such that capillary pockets are formed which allow solution to flow through.

Thus, for separation of water from an aqueous solution of a solute the polymer comprising the semi-permeable membrane should contain hydrophilic groups to promote diffusion of water and hydrophobic units, optionally together with cross-links, to limit the membrane porosity and to increase the mechanical strength.

Cross-linking organic compounds, containing at least two ethylenically unsaturated groups, to tighten up the structure include ethylene glycol dimethacrylate, trimethylol propane trimethacrylate, pentaerythritol tetramethacrylates, methylene-bis-acrylamide, triethylene glycol dimethacrylate, tetraethylene glycol dimethacrylate, divinyl benzene and poly(ethylene fumarate).

Polymers suitable as asymmetric membranous articles for use in separations include poly(2-hydroxy ethyl methacrylate), poly (2-hydroxy propyl methacrylate), poly (vinyl pyrrolidone), poly (ethyl acrylate), poly (methyl methacrylate), poly (vinylene carbonate), poly (vinyl alcohol), poly (vinyl acetate), poly (methyl methacrylate/galactose methacrylate), poly (vinyl methyl ether/maleic anhydride), poly (2-hydroxyethyl methacrylate/methacrylic acid) and copolymers containing any of the above components. Non-polymerisable additives may also be present. Further, the strength or dimensional stability may be increased by the incorporation of a reinforcing assembly such as a woven or non-woven fabric.

The function of the inert liquid is principally to provide a freezable medium to give the hole structure in the porous matrix. Depending on the temperature employed during freezing, the inert liquid may be incompletely frozen out leaving a concentrated monomer solution in the interstices or, if the temperature is sufficiently low and the monomer is liquid, the inert liquid may be completely frozen out leaving monomer in the interstices.

The volume of inert liquid controls the total pore volume and to some degree the pore size which is also dependent on the mode and conditions of freezing. The proportion of inert liquid must be such that the porous layer provides no barrier to flow which will be controlled by the permeability of the membrane top layer.

The inert liquid used in a particular system is defined by that system. It must be a solvent for the monomer and polymer in order to get a homogeneous gel, and also for any catalysts used.

The separating properties of the semi-permeable membrane layer is also modified by the inert liquid content of the mixture and for maximum separation the inert liquid content must be at a minimum.

It is preferred that the concentration of monomer, including crosslinking organic compound if present, in the mixture lies within the range 50 to 95 percent by weight inclusive and that the concentration of inert liquid in the mixture lies within the range 50 to 5 percent by weight inclusive.

Suitable inert liquids for use with hydroxyethyl methacrylate as monomer include water, ethylene glycol, dioxane, formamide or mixtures thereof.

Suitable inert liquids for use with either methyl methacrylate or styrene as monomer include benzene, cyclohexane, paraffin wax or mixtures thereof.

Suitable inert liquids for use with acrylamide as monomer include water, trioxane, urea, glacial acetic acid or mixtures thereof.

Polymerisation of the monomer must be by non-thermal means. Such non-thermal means include radiation, such as visible or ultra-violet light with or without a sensitiser, ultrasonic, corona discharge, electrochemical or non-thermal chemical means.

Suitable sensitisers for use in photopolymerisation by visible light include uranyl salts, or methylene blue in conjunction with a mild reducing agent such as sodium p-toluene sulphinate.

Suitable sensitisers for use in photopolymerisation by ultra-violet light include benzoin or benzoin methyl ether.

The following examples, in which all parts and percentages are by weight, illustrate but do not limit the present invention.

EXAMPLE 1

Hydroxyethyl methacrylate (4.5 parts), ethylene glycol dimethacrylate (0.5 parts) and uranyl nitrate (0.1 parts) were mixed with 3.33 parts of an inert liquid comprising an aqueous ethylene glycol solution (4:1 by volume water: ethylene glycol) to give a homogeneous solution. A film of the solution was cooled between two thin glass plates with the lower plate maintained at $-40°C$. When the inert liquid in the film had solidified by freezing, a glass cell containing circulating water at approximately 20°C was placed on the top glass plate such that the top surface of the frozen film melted. The film was irradiated for 10 minutes by a 125 watt medium pressure mercury lamp located at a distance of approximately 5 cm above the top surface of the film. The inert liquid was then removed by melting to yield an asymmetric membrane. A photomicrograph showed the membrane to be 0.5 mm thick and to consist of a porous structure of 0.45 mm thickness having adjacent one face a semi-permeable membrane of 50 microns thickness.

EXAMPLE 2

An aqueous solution which was 5.8 molar in 2-hydroxyethyl methacrylate, $2.2 \times 10^{-4}$ molar in methylene blue and $7.1 \times 10^{-3}$ molar in sodium p-toluene sulphinate was unidirectionally frozen by spreading on a glass plate maintained at $-63°C$. The frozen film was partially polymerised by irradiating for 10 minutes with a 750 watt tungsten-iodine lamp located at a distance of 7 cm above the film. The frozen film was then warmed to allow the water to melt. A layer at the bottom of the film which had not polymerised in the frozen film was polymerised at room temperature.

The resultant membrane was asymmetric. A photomicrograph showed the membrane to be 0.75 mm thick and to consist of a porous structure of 0.67 mm thickness having adjacent one face a semi-permeable membrane of approximately 80 microns thickness.

EXAMPLE 3

A rotating steel drum was cooled to a surface temperature of approx. $-60°C$ in methanol/solid $CO_2$. The drum was then rotated at about 60 rpm such that it touched the surface of a solution consisting of, 125 parts acrylamide
60 parts ethylene glycol
240 parts water
1.4 parts uranyl nitrate A film of approx. 0.1 cm thickness was picked up on the drum. The solution was removed and the film was heated by a 350 watt rod heater situated about 0.2 cm from the film surface. After two minutes the surface of the film was just wet after passing the heater. The film was then irradiated with a 750 w tungsten-iodine lamp situated approx. 6.5 cm from the drum surface such that the light fell on the film immediately after passing the heater. After 5 minutes irradiation the lamp was switched off and the frozen aqueous ethylene glycol removed by washing in cold methanol. The membrane film was next removed from the drum, allowed to warm up to room temperature in methanol and allowed to dry in air. Microscopic examination revealed a membrane film 0.80 mm thick, with a porous layer 0.76 mm thick and a non-porous layer of approx. 40 microns thickness.

What we claim is:

1. A process for making an asymmetric membranous article having a laminar film structure which comprises:
   a. forming a first film of a mixture of at least one organic monomer containing an ethylenically unsaturated group and at least one inert liquid;
   b. cooling said first film to at least partially solidify said liquid prior to polymerization;
   c. forming a second film of a second organic monomer containing an ethylenically unsaturated group, said second film being in a liquid state;
   d. non-thermally polymerizing said first and second films in such a manner that during at least the non-thermal polymerization of said first or second film the films are in a laminar formation; and
   e. subsequently removing said inert liquid to form a film structure in which one surface layer comprises a semipermeable membrane and the other adjacent surface layer comprises a porous structure.

2. A process according to claim 1 in which the second monomer, from which the semi-permeable membrane is obtained, is in the form of a solution in an inert liquid during the non-thermal polymerisation.

3. A process according to claim 2 in which the concentration of the second monomer, including crosslinking organic compound if present, in the solution lies within the range 50 to 95% by weight inclusive and the concentration of inert liquid in the solution lies within the range 50 to 5% by weight inclusive.

4. A process according to claim 1 in which a cross-linking organic compound containing at least two ethylenically unsaturated groups is present in at least one of the monomers.

5. A process according to claim 1 in which the first and second films consist of the same organic monomer.

6. A process according to claim 5 comprising the steps in combination (1) forming a film of the monomer-liquid mixture, (2) cooling said film to at least partially solidify the liquid, (3) melting one surface of said film, (4) polymerising to completion said monomer by non-thermal polymerisation whilst maintaining said one surface of said film in a liquid state and (5) subsequently removing said liquid.

7. A process according to claim 6 in which the film of the mixture is uni-directionally frozen.

8. A process according to claim 6 in which the mixture is spread in the form of a film and is partially frozen to solidify the liquid such that one surface of said film is maintained in a liquid state.

9. A process according to claim 5 comprising the steps in combination (1) forming a film of the monomer-liquid mixture, (2) cooling said film to at least partially solidify said liquid, (3) partially polymerising said monomer to a given depth by uni-directional non-thermal polymerisation, (4) melting that part of the solidified film containing unpolymerised monomer, (5) subjecting said unpolymerised monomer to polymerisation and (6) subsequently removing said liquid.

10. A process according to claim 1 in which a reinforcing assembly is incorporated in the asymmetric membranous article.

11. An asymmetric membranous article produced according to the process of claim 1.

* * * * *